United States Patent
Greasley et al.

(10) Patent No.: US 11,949,949 B2
(45) Date of Patent: Apr. 2, 2024

(54) CONTENT GENERATION BASED ON AUDIENCE ENGAGEMENT

(71) Applicant: Apple Inc., Cupertino, CA (US)

(72) Inventors: Jack Greasley, Mill Valley, CA (US); Philip Michael Simmons, San Jose, CA (US)

( * ) Notice: Subject to any disclaimer, the term of this patent is extended or adjusted under 35 U.S.C. 154(b) by 318 days.

(21) Appl. No.: 17/463,097

(22) Filed: Aug. 31, 2021

(65) Prior Publication Data

US 2021/0400342 A1 Dec. 23, 2021

Related U.S. Application Data

(63) Continuation of application No. PCT/US2020/050885, filed on Sep. 15, 2020.

(60) Provisional application No. 62/906,789, filed on Sep. 27, 2019.

(51) Int. Cl.
*H04N 21/442* (2011.01)
*G06F 3/01* (2006.01)
*G06V 40/16* (2022.01)
*H04N 13/117* (2018.01)

(52) U.S. Cl.
CPC ....... *H04N 21/44218* (2013.01); *G06F 3/013* (2013.01); *G06V 40/176* (2022.01); *H04N 13/117* (2018.05)

(58) Field of Classification Search
CPC ....... H04N 21/44218; H04N 21/23424; H04N 21/252; H04N 21/4223; H04N 21/42203
USPC .......................................... 725/14
See application file for complete search history.

(56) References Cited

U.S. PATENT DOCUMENTS

| | | | |
|---|---|---|---|
| 9,202,110 B2 | 12/2015 | Movellan et al. | |
| 9,465,435 B1* | 10/2016 | Zhang | H04N 21/8549 |
| 10,007,921 B2 | 6/2018 | Movellan et al. | |
| 2003/0118974 A1* | 6/2003 | Obrador | G09B 23/28 434/236 |
| 2007/0121824 A1 | 5/2007 | Agapi et al. | |
| 2008/0151038 A1 | 6/2008 | Khouri et al. | |
| 2011/0292162 A1 | 12/2011 | Byun et al. | |
| 2013/0039483 A1 | 2/2013 | Wolfeld et al. | |
| 2013/0205314 A1* | 8/2013 | Ramaswamy | H04N 21/42201 725/14 |
| 2013/0298146 A1 | 11/2013 | Conrad et al. | |

(Continued)

OTHER PUBLICATIONS

PCT International Search Report and Written Opinion dated Dec. 2, 2020, International Application No. PCT/US2020/050885, pp. 1-12.

*Primary Examiner* — Cynthia M Fogg
(74) *Attorney, Agent, or Firm* — Fernando & Partners, LLP

(57) ABSTRACT

Various implementations disclosed herein include devices, systems, and methods for performing content generation based on audience engagement. In some implementations, a method includes presenting a first portion of content. Engagement data is obtained for an audience comprising a plurality of persons while the first portion of the content is presented. Based on the engagement data, a collective engagement level of the audience is determined for the first portion of the content. A second portion of the content that has not been presented is adjusted based on the collective engagement level of the audience for the first portion of the content in order to satisfy an engagement threshold. After adjusting the second portion of the content, the second portion of the content is presented to the audience.

19 Claims, 8 Drawing Sheets

(56) References Cited

U.S. PATENT DOCUMENTS

| | | |
|---|---|---|
| 2014/0063236 A1 | 3/2014 | Shreve et al. |
| 2015/0121246 A1 | 4/2015 | Poore et al. |
| 2016/0021412 A1 | 1/2016 | Zito, Jr. |
| 2018/0070145 A1* | 3/2018 | Foerster ............ H04N 21/44213 |
| 2018/0091574 A1 | 3/2018 | Cavalier et al. |
| 2019/0222894 A1 | 7/2019 | Terrazas |
| 2019/0286890 A1 | 9/2019 | Khanna et al. |
| 2020/0213632 A1* | 7/2020 | Goldberg .............. H04N 21/235 |
| 2020/0342683 A1* | 10/2020 | Panec .................... A63F 13/327 |
| 2021/0274244 A1* | 9/2021 | Wondra ........... H04N 21/43076 |
| 2022/0007075 A1* | 1/2022 | Richter .............. H04N 21/4532 |

* cited by examiner

CONTENT GENERATION BASED ON AUDIENCE ENGAGEMENT

CROSS-REFERENCE TO RELATED APPLICATION

This application is a continuation of Intl. Patent App. No. PCT/US2020/50885, filed on Sep. 15, 2020, which claims priority to U.S. Provisional Patent App. No. 62/906,789, filed on Sep. 27, 2019, which are both hereby incorporated by reference in their entirety.

TECHNICAL FIELD

The present disclosure generally relates to generation of computer-generated graphics and content.

BACKGROUND

Some devices are capable of generating and presenting extended reality (XR) content that are simulated replacements of physical things or modified versions of physical things. Sometimes, the timing and presentation of content is predetermined. Sometimes, the timing and presentation of content are affected by run-time input obtained from a user.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
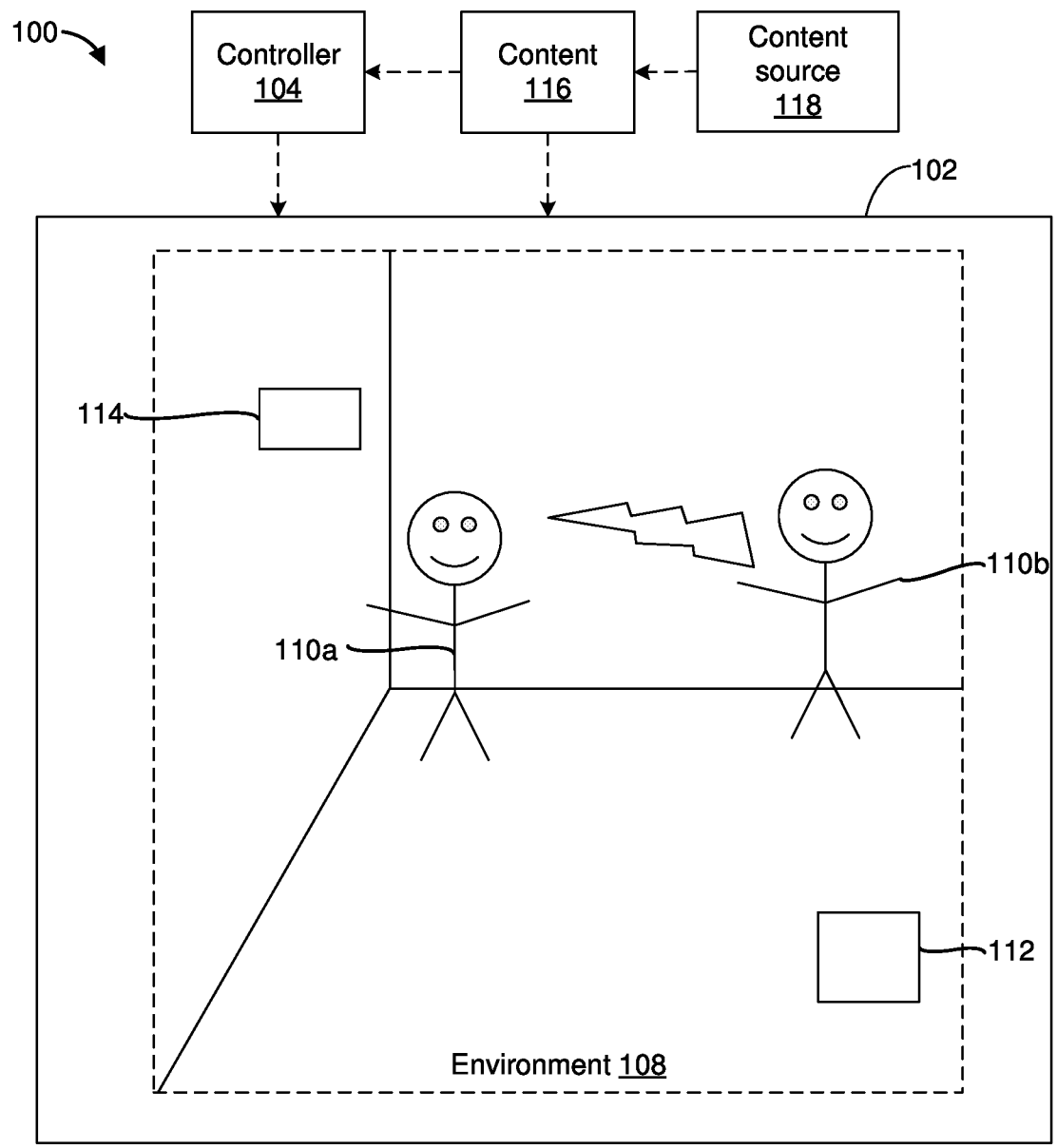
FIG. 1 depicts an exemplary system for use in various computer extended reality technologies, including virtual reality and mixed reality.
Figure 1:
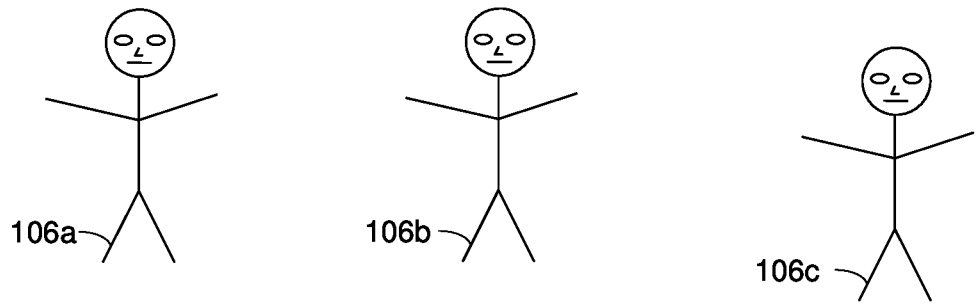

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method, or device. Finally, like reference numerals may be used to denote like features throughout the specification and figures.

SUMMARY

Various implementations disclosed herein include devices, systems, and methods for performing content generation based on audience engagement. In various implementations, a device includes a non-transitory memory and one or more processors coupled with the non-transitory memory. In some implementations, a method includes presenting a first portion of content. Engagement data is obtained for an audience comprising a plurality of persons while the first portion of the content is presented. Based on the engagement data, a collective engagement level of the audience is determined for the first portion of the content. A second portion of the content that has not been presented is adjusted based on the collective engagement level of the audience for the first portion of the content in order to satisfy an engagement threshold. After adjusting the second portion of the content, the second portion of the content is presented to the audience.

In accordance with some implementations, a device includes one or more processors, a non-transitory memory, and one or more programs. In some implementations, the one or more programs are stored in the non-transitory memory and are executed by the one or more processors. In some implementations, the one or more programs include instructions for performing or causing performance of any of the methods described herein. In accordance with some implementations, a non-transitory computer readable storage medium has stored therein instructions that, when executed by one or more processors of a device, cause the device to perform or cause performance of any of the methods described herein. In accordance with some implementations, a device includes one or more processors, a non-transitory memory, and means for performing or causing performance of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices, and circuits have not been described in exhaustive detail so as not to obscure more pertinent aspects of the example implementations described herein.

A physical environment refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Some devices that present XR environments are ineffective at presenting XR content that is viewed by multiple people at once. For example, when multiple people view content on a device together, some devices are unable to generate sufficient sensory stimulation to retain the interest of all of the people in the audience.

In some implementations, a device generates and presents a first portion of content. The device may determine a collective engagement level of the audience comprising multiple people viewing the content and modify the content based on the collective engagement level. In some implementations, the collective engagement level is determined by averaging individual engagement levels.

Individual engagement levels may be determined by monitoring one or more metrics. These metrics may include, for example, facial expressions of one or more members of the audience, vocalizations or other sounds produced by one or more members of the audience, input from an input device, bodily postures or movements exhibited by one or more members of the audience, and/or the entry and/or exit of members to or from the audience.

The present disclosure provides methods, systems, and/or devices for performing content generation based on audience engagement. In various implementations, a device includes a non-transitory memory and one or more processors coupled with the non-transitory memory. In some implementations, a method includes presenting a first portion of content. Engagement data is obtained for an audience comprising a plurality of persons while the first portion of the content is presented. Based on the engagement data, a collective engagement level of the audience is determined for the first portion of the content. A second portion of the content that has not been presented is adjusted based on the collective engagement level of the audience for the first portion of the content in order to satisfy an engagement threshold. After adjusting the second portion of the content, the second portion of the content is presented to the audience.

In some implementations, the content is modified on a trial-and-error basis. For example, the device may continue modifying the content until the collective engagement level satisfies an engagement threshold.

In some implementations, the content is modified based on engagement data (e.g., facial expressions) associated with audience members during previous portions of the content. For example, if the collective engagement data indicates that the audience members appear to be happy when a particular character (e.g., an XR representation of a particular character objective-effectuator) is visible, the device may modify the content to give that character a greater role (e.g., more screen time) in the remainder of the content (e.g., by generating more actions for that character objective-effectuator). Conversely, if the collective engagement data indicates that the audience members appear to be unhappy when a particular character is visible, the device may modify the content to reduce the screen time of that character in the remainder of the content (e.g., by generating fewer actions for that character objective-effectuator).

In some implementations, an electronic device comprises one or more processors working with non-transitory memory. In some implementations, the non-transitory memory stores one or more programs of executable instructions that are executed by the one or more processors. In some implementations, the executable instructions carry out the techniques and processes described herein. In some implementations, a computer (readable) storage medium has instructions that, when executed by one or more processors of an electronic device, cause the electronic device to perform, or cause performance, of any of the techniques and processes described herein. The computer (readable) storage medium is non-transitory. In some implementations, a device includes one or more processors, a non-transitory memory, and means for performing or causing performance of the techniques and processes described herein.

A head-mounted system may have one or more speaker(s) and an integrated opaque display. Alternatively, a head-mounted system may be configured to accept an external opaque display (e.g., a smartphone). The head-mounted system may incorporate one or more imaging sensors to capture images or video of the physical environment, and/or one or more microphones to capture audio of the physical environment. Rather than an opaque display, a head-mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one implementation, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

In accordance with some implementations, a device includes one or more processors, a non-transitory memory, and one or more programs. In some implementations, the one or more programs are stored in the non-transitory memory and are executed by the one or more processors. In some implementations, the one or more programs include instructions for performing or causing performance of any of the methods described herein. In accordance with some implementations, a non-transitory computer readable storage medium has stored therein instructions that, when executed by one or more processors of a device, cause the device to perform or cause performance of any of the methods described herein. In accordance with some implementations, a device includes one or more processors, a non-transitory memory, and means for performing or causing performance of any of the methods described herein.

FIG. 1 illustrates an exemplary operating environment 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 100 includes an electronic device 102 and a controller 104. In some implementations, the electronic device 102 is or includes a smartphone, a tablet, a laptop computer, and/or a desktop computer. The electronic device 102 may be worn by or carried by a user 106a, 106b, or 106c (for brevity, collectively referred to as a user 106 or users 106).

As illustrated in FIG. 1, the electronic device 102 presents an extended reality (XR) environment 108. In some implementations, the XR environment 108 is generated by the electronic device 102 and/or the controller 104. In some implementations, the XR environment 108 includes a virtual environment that is a simulated replacement of a physical environment. For example, the XR environment 108 may be simulated by the electronic device 102 and/or the controller 104. In such implementations, the XR environment 108 is different from the physical environment in which the electronic device 102 is located.

In some implementations, the XR environment 108 includes an augmented environment that is a modified version of a physical environment. For example, in some implementations, the electronic device 102 and/or the controller 104 modify (e.g., augment) the physical environment in which the electronic device 102 is located in order to generate the XR environment 108. In some implementations, the electronic device 102 and/or the controller 104 generate the XR environment 108 by simulating a replica of the physical environment in which the electronic device 102 is located. In some implementations, the electronic device 102 and/or the controller 104 generate the XR environment 108 by removing and/or adding items from the simulated replica of the physical environment where the electronic device 102 is located.

In some implementations, the XR environment 108 includes XR representations of various objective-effectuators such as a character representation 110a, a character representation 110b, a robot representation 112, and a drone representation 114. In some implementations, the objective-effectuators represent characters from fictional materials such as movies, video games, comics, and novels. For example, the character representation 110a may represent a character from a fictional comic, and the character representation 110b represents and models the behavior of a character from a fictional video game. In some implementations, the XR environment 108 includes objective-effectuators that represent characters from different fictional materials (e.g., from different movies/games/comics/novels). In various implementations, the objective-effectuators model the behavior of corresponding entities (e.g., tangible objects or fictional objects). For example, in some implementations, the objective-effectuators model the behavior of equipment (e.g., machinery such as planes, tanks, robots, cars, etc.). In the example of FIG. 1, the robot representation 112 models the behavior of a robot and the drone representation 114 models the behavior of a drone. In some implementations, the objective-effectuators represent entities (e.g., characters or equipment) from fictional material. In some implementations, the objective-effectuators represent entities from the physical environment, including entities located inside and/or outside of the XR environment 108. In some implementations, an objective-effectuator is referred to as a virtual intelligent agent (VIA), an intelligent agent or an agent.

In various implementations, the objective-effectuators perform one or more actions. In some implementations, the objective-effectuators perform a sequence of actions. In some implementations, the electronic device 102 and/or the controller 104 determine the actions that the objective-effectuators are to perform. In some implementations, the actions of the objective-effectuators are within a degree of similarity to actions that the corresponding entities (e.g., fictional characters or fiction equipment) perform in the fictional material. In the example of FIG. 1, the character representation 110b is performing the action of casting a magic spell (e.g., because the corresponding character is capable of casting a magic spell in the fictional material). In the example of FIG. 1, the drone representation 114 is performing the action of hovering (e.g., because drones in a physical environment are capable of hovering). In some implementations, the electronic device 102 and/or the controller 104 obtain the actions for the objective-effectuators. For example, in some implementations, the electronic device 102 and/or the controller 104 receive the actions for the objective-effectuators from a remote server that determines (e.g., selects) the actions.

In various implementations, an objective-effectuator performs an action in order to satisfy (e.g., complete or achieve) an objective. In some implementations, an objective-effectuator is associated with a particular objective, and the objective-effectuator performs actions that improve the likelihood of satisfying that particular objective. In some implementations, the objective-effectuators are referred to as object representations, for example, because the objective-effectuators represent various objects (e.g., objects in the physical environment or fictional objects). In some implementations, an objective-effectuator that models the behavior of a character is referred to as a character objective-effectuator, a virtual character or a character agent. In some implementations, a character objective-effectuator performs actions to effectuate a character objective. In some implementations, an objective-effectuator that models the behavior of an equipment is referred to as an equipment objective-effectuator, a virtual equipment or an equipment agent. In some implementations, an equipment objective-effectuator performs actions to effectuate an equipment objective. In some implementations, an objective effectuator that models the behavior of an environment is referred to as an environmental objective-effectuator. In some implementations, an environmental objective effectuator performs environmental actions to effectuate an environmental objective.

In some implementations, the XR environment 108 is generated based on a user input from the user 106. For example, in some implementations, a mobile device (not shown) receives a user input indicating a terrain for the XR environment 108. In such implementations, the electronic device 102 and/or the controller 104 configure the XR environment 108 such that the XR environment 108 includes the terrain indicated via the user input. In some implementations, the user input indicates environmental conditions. In such implementations, the electronic device 102 and/or the controller 104 configure the XR environment 108 to have the environmental conditions indicated by the user input. In some implementations, the environmental conditions include one or more of temperature, humidity, pressure, visibility, ambient light level, ambient sound level, time of day (e.g., morning, afternoon, evening, or night), and precipitation (e.g., overcast, rain, or snow).

In some implementations, the actions for the objective-effectuators are determined (e.g., generated) based on a user input from the user 106. For example, in some implementations, the mobile device receives a user input indicating placement of the objective-effectuators. In such implementations, the electronic device 102 and/or the controller 104 position the objective-effectuators in accordance with the placement indicated by the user input. In some implementations, the user input indicates specific actions that the objective-effectuators are permitted to perform. In such implementations, the electronic device 102 and/or the controller 104 select the actions for the objective-effectuator from the specific actions indicated by the user input. In some implementations, the electronic device 102 and/or the controller 104 forgo actions that are not among the specific actions indicated by the user input.

In some implementations, the electronic device 102 and/or the controller 104 receive existing XR content 116 from an XR content source 118. The XR content 116 may specify one or more actions that are to be performed by one or more objective-effectuators in order to satisfy (e.g., complete or achieve) one or more objectives.

In some implementations, the electronic device 102 and/or the controller 104 generates and presents XR content to an audience that includes multiple people. The electronic device 102 and/or the controller 104 may determine a collective engagement level of the audience viewing the XR content and modify the XR content based on the collective engagement level. In some implementations, the collective engagement level is determined by averaging individual engagement levels.

The electronic device 102 and/or the controller 104 may determine individual engagement levels by obtaining engagement data. In some implementations, engagement data includes one or more of, for example, facial expressions of one or more members of the audience, vocalizations or other sounds produced by one or more members of the audience, input from an input device, bodily postures or movements exhibited by one or more members of the audience, and/or the entry and/or exit of members to or from the audience. The engagement data may be obtained while a first portion of the XR content is presented to the audience. Based on the engagement data, the electronic device 102 and/or the controller 104 may determine a collective engagement level of the audience during the presentation of the first portion of the XR content.

In some implementations, the electronic device 102 and/or the controller 104 adjusts a second portion of the XR content that has not been presented to the audience based on the collective engagement level of the audience that was determined during the presentation of the first portion of the XR content. After adjusting the second portion of the XR content, the electronic device 102 and/or the controller 104 may present the second portion of the XR content to the audience in order to satisfy an engagement threshold.

In some implementations, the electronic device 102 and/or the controller 104 modifies the XR content on a trial-and-error basis. For example, the electronic device 102 and/or the controller 104 may continue modifying the XR content until the collective engagement level satisfies an engagement threshold. As another example, the electronic device 102 and/or the controller 104 may modify the XR content, determine the effect of the modification on the collective engagement level, and modify the XR content again based on the determined effect of the previous modification.

In some implementations, the electronic device 102 and/or the controller 104 modifies the XR content based on engagement data (e.g., facial expressions) associated with audience members during previous portions of the XR content. For example, if the collective engagement data indicates that the audience members appear to be happy when a particular character is visible, the electronic device 102 and/or the controller 104 may modify the XR content to give that character a greater role (e.g., more screen time) in the remainder of the XR content. For example, the electronic device 102 and/or the controller 104 generates more actions for a character objective-effectuator that represents and models the behavior of the character. Conversely, if the collective engagement data indicates that the audience members appear to be unhappy when a particular character is visible, the electronic device 102 and/or the controller 104 may modify the XR content to reduce the screen time of that character in the remainder of the XR content. For example, the electronic device 102 and/or the controller 104 generates fewer actions for a character objective-effectuator that represents and models the behavior of the character.

In some implementations, head-mountable devices (HMDs) being worn by users respectively present (e.g., display) the extended reality (XR) environment 108 according to various implementations. In some implementations, each HMD displays a customized XR environment 108 for its respective user. For example, one HMD may display the XR environment 108 from the perspective of a first user, while another HMD may display the XR environment 108 from the perspective of a second user. As another example, a HMD may display elements in the XR environment 108 that are visible to the user, while forgoing displaying elements that are not visible to the user.

In some implementations, each HMD includes an integrated display (e.g., a built-in display) that displays the XR environment 108. In some implementations, each HMD includes a head-mountable enclosure. In various implementations, the head-mountable enclosure includes an attachment region to which another device with a display can be attached. For example, in some implementations, the electronic device 102 of FIG. 1 can be attached to the head-mountable enclosure. In various implementations, the head-mountable enclosure is shaped to form a receptacle for receiving another device that includes a display (e.g., the electronic device 102). For example, in some implementations, the electronic device 102 slides or snaps into or otherwise attaches to the head-mountable enclosure. In some implementations, the display of the device attached to the head-mountable enclosure presents (e.g., displays) the XR environment 108. In various implementations, examples of the electronic device 102 include smartphones, tablets, media players, laptops, etc.

Figure 2:
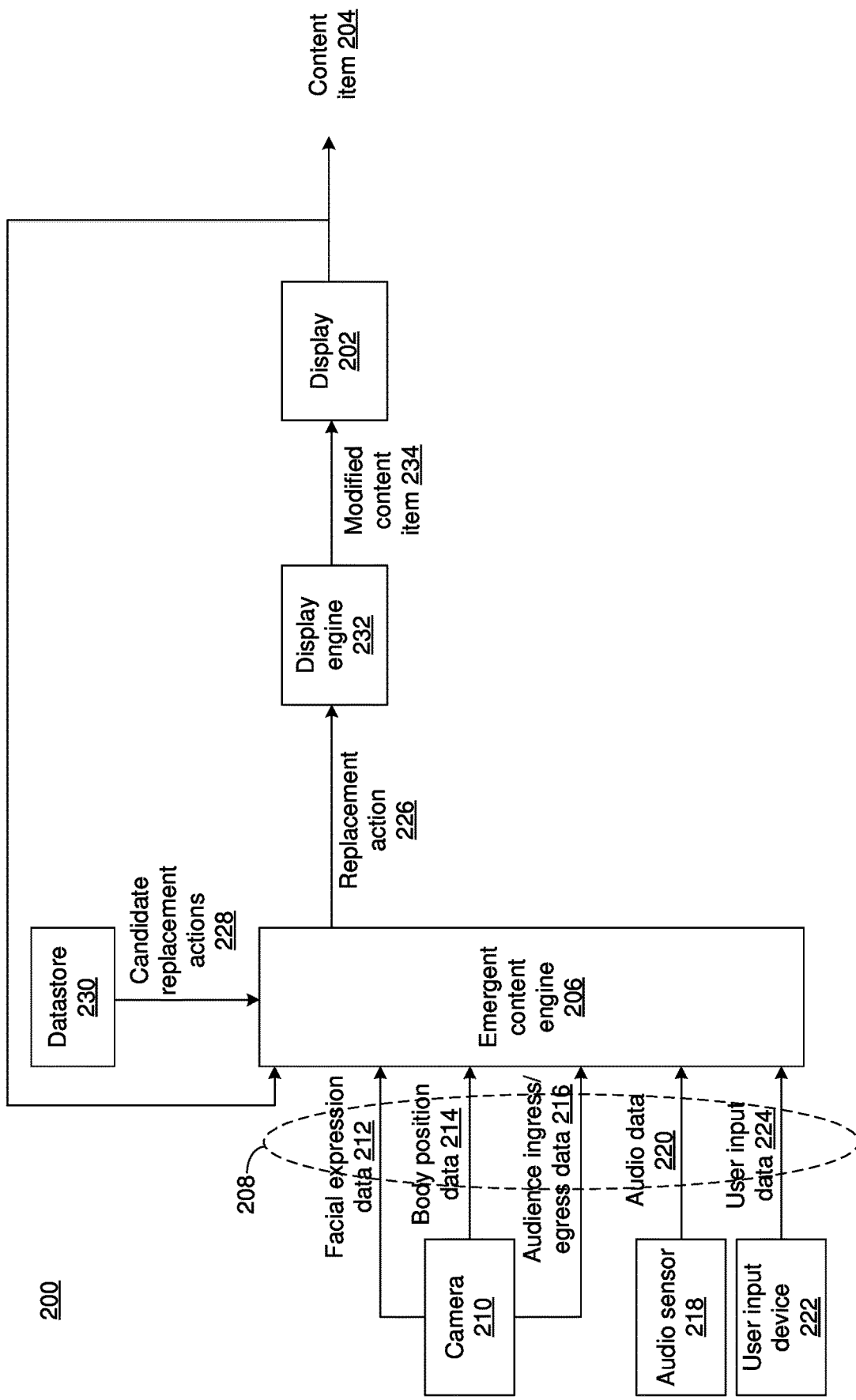
FIG. 2 illustrates an example system that performs content generation according to various implementations.

FIG. 2 illustrates an example system 200 that performs XR content generation according to various implementations. In some implementations, a display 202 presents XR content, e.g., an XR content item 204, to an audience including multiple persons. While the display 202 presents the XR content item 204, in some implementations, an emergent content engine 206 obtains engagement data 208 from the audience that indicates a degree of engagement that a person in the audience is experiencing with the XR content item 204. In particular, the emergent content engine 206 may obtain engagement data 208 relating to a first portion of the XR content item 204 while the display 202 is presenting the XR content item 204.

In some implementations, the emergent content engine 206 receives the engagement data 208 from one or more sources. For example, the emergent content engine 206 may receive engagement data 208 from a camera 210. In some implementations, the engagement data 208 includes facial expression data 212 relating to one or more members of the audience. The engagement data 208 may include body position data 214, which may describe, for example, the body pose, posture, and/or motion of one or more members of the audience. In some implementations, the engagement data 208 includes audience ingress/egress data 216 that indicates whether people are entering and/or leaving the audience. The audience ingress/egress data 216 may indicate a net change in the number of persons in the audience. In some implementations, the audience ingress/egress data 216 indicates the ingress and/or egress of individual members of the audience.

As another example, in some implementations, the emergent content engine 206 receives the engagement data 208 from an audio sensor 218, such as a microphone. For example, the engagement data 208 may include audio data 220, such as vocalizations or other sounds produced by one or more members of the audience.

As another example, in some implementations, the emergent content engine 206 receives the engagement data 208 from a user input device 222 (e.g., an input device), such as a keyboard, mouse, or touchscreen, as user input data 224. For example, a member of the audience may indicate his or her level of engagement with the XR content item 204 using a keyboard or mouse input. In some implementations, a member of the audience may indicate satisfaction or dissatisfaction with the XR content item 204 using an on-screen control in a graphical user interface accessed, for example, by a mouse or touchscreen interface.

In some implementations, the emergent content engine 206 determines a collective engagement level of the audience during the presentation of the first portion of the XR content item 204. The collective engagement level may quantify the engagement level of the audience as a whole. In some implementations, the emergent content engine 206 determines the collective engagement level by averaging the individual engagement levels, e.g., by averaging the engagement data 208 received from one or more of the camera 210, the audio sensor 218, and/or the user input device 222. More generally, in various implementations, the collective engagement level is a function (e.g., a simple average, a weighted average, a median, etc.) of the individual engagement levels.

In some implementations, the individual engagement levels of certain audience members (e.g., audience members that are younger/older than a threshold age) are given more weight than the individual engagement levels of other audience members. In some implementations, the individual engagement levels of audience members that are associated with a threshold number of credits are given more weight than the individual engagement levels of audience members that are not associated with the threshold number of credits.

Based on the collective engagement level, the emergent content engine 206 may modify the XR content item 204. In some implementations, on a condition that the collective engagement level breaches a threshold (e.g., is lower than a target collective engagement level), the emergent content engine 206 modifies the XR content item 204. For example, in some implementations, the emergent content engine 206 adjusts a second portion of the XR content that has not been presented to the audience if the collective engagement level is lower than the target collective engagement level.

In some implementations, the emergent content engine 206 modifies the XR content item 204 by adjusting a portion of the XR content item 204 that has not yet been presented to the audience, e.g., a second portion of the XR content item 204. For example, the emergent content engine 206 may replace a first action in the second portion of the XR content item 204 with a second action, e.g., a replacement action 226.

In some implementations, the emergent content engine 206 obtains the replacement action 226. The emergent content engine 206 may obtain one or more candidate replacement actions 228. The emergent content engine 206 may retrieve the one or more candidate replacement actions 228 from a datastore 230. In some implementations, the emergent content engine 206 synthesizes the one or more candidate replacement actions 228.

In some implementations, the emergent content engine 206 obtains a set of candidate replacement actions 228. The emergent content engine 206 may select the replacement action 226 from the candidate actions based on one or more criteria. In some implementations, the emergent content engine 206 selects the replacement action 226 based on the degree of similarity between a particular candidate action and the action that is to be replaced. In some implementations, the emergent content engine 206 selects the replacement action 226 based on a degree to which a particular candidate action satisfies an objective satisfied by the action that is to be replaced.

In some implementations, the replacement action 226 is within a degree of similarity to the action that is to be replaced. For example, the emergent content engine 206 may query the datastore 230 to return candidate replacement actions 228 that are within a threshold degree of similarity to the action that is to be replaced. Accordingly, for example, if the action that is to be replaced is a gunshot, the set of candidate replacement actions 228 may include a punch or a kick but may exclude an exchange of gifts, for example, because an exchange of gifts is too dissimilar to a gunshot.

In some implementations, the replacement action 226 satisfies (e.g., completes or achieves) the same objective as the action that is to be replaced. For example, the emergent content engine 206 may query the datastore 230 to return candidate replacement actions 228 that satisfy the same objective as the action that is to be replaced. In some implementations, for example, if an objective satisfied by the action is not indicated by metadata, the emergent content engine 206 determines an objective that the action satisfies and selects the replacement action 226 based on that objective.

In some implementations, the emergent content engine 206 modifies the XR content item 204 on a trial-and-error basis. For example, the emergent content engine 206 may continue modifying portions of the XR content item 204 until the collective engagement level satisfies an engagement threshold. As another example, the emergent content engine 206 may modify a portion of the XR content item 204, determine the effect of the modification on the collective engagement level, and modify another portion of the XR content item 204 based on the determined effect of the previous modification.

In some implementations, the emergent content engine 206 modifies the XR content item 204 based on the collective engagement data during previous portions of the XR content. For example, if the collective engagement data indicates that the audience members appear to be happy when a particular character is visible, the emergent content engine 206 may modify the XR content item 204 to give that character a greater role (e.g., more screen time) in the remainder of the XR content item 204. Conversely, if the collective engagement data indicates that the audience members appear to be unhappy when a particular character is visible, the emergent content engine 206 may modify the XR content item 204 to reduce the screen time of that character in the remainder of the XR content item 204.

In some implementations, the emergent content engine 206 provides the replacement action 226 to a display engine 232. The display engine 232 modifies the XR content item 204 by replacing the original action with the replacement action 226 to generate a modified XR content item 234. For example, the display engine 232 modifies pixels and/or audio data of the XR content item 204 to represent the replacement action 226. In this way, the system 200 generates a modified XR content item 234 that satisfies an engagement threshold, e.g., the target collective engagement level.

After generating the modified XR content item 234 with the adjusted second portion of the XR content item 204, the display engine 232 provides the modified XR content item 234 to a rendering and display engine. In some implementations, the display 202 presents the modified XR content item 234, with the adjusted second portion of the XR content item 204, to the audience in order to satisfy an engagement threshold, e.g., the target collective engagement level. In some implementations, the display engine 232 transmits the modified XR content item 234 to another device that displays the modified XR content item 234.

Figure 3A:
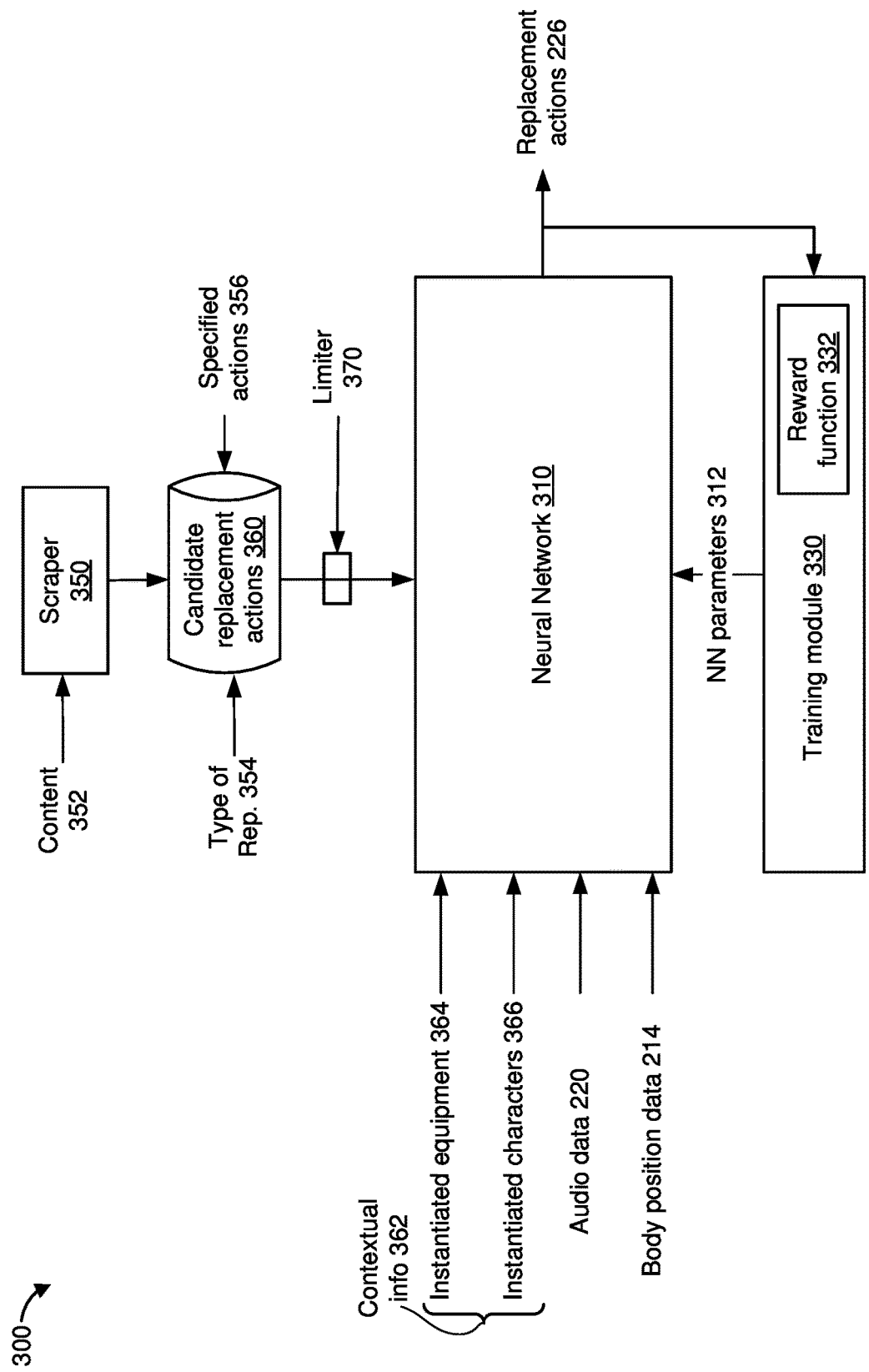
FIG. 3A is a block diagram of an example content generation device in accordance with some implementations.

FIG. 3A is a block diagram of an example emergent content engine 300 in accordance with some implementations. In some implementations, the emergent content engine 300 implements the emergent content engine 206 shown in FIG. 2. In some implementations, the emergent content engine 300 generates candidate replacement actions for various objective-effectuators that are instantiated in an XR environment (e.g., character or equipment representations such as the character representation 110a, the character representation 110b, the robot representation 112, and/or the drone representation 114 shown in FIG. 1).

In various implementations, the emergent content engine 300 includes a neural network system 310 ("neural network 310", hereinafter for the sake of brevity), a neural network training system 330 ("training module 330", hereinafter for the sake of brevity) that trains (e.g., configures) the neural network 310, and a scraper 350 that provides candidate replacement actions 360 to the neural network 310. In various implementations, the neural network 310 generates a replacement action, e.g., the replacement action 226 shown in FIG. 2, to replace an action to generate a modified XR content item to satisfy an engagement threshold, e.g., the target collective engagement level.

In some implementations, the neural network 310 includes a long short-term memory (LSTM) recurrent neural network (RNN). In various implementations, the neural network 310 generates the replacement action 226 based on a function of the candidate replacement actions 360. For example, in some implementations, the neural network 310 generates replacement actions 226 by selecting a portion of the candidate replacement actions 360. In some implementations, the neural network 310 generates replacement actions 226 such that the replacement actions 226 are within a degree of similarity to the candidate replacement actions 360 and/or to the action that is to be replaced.

In various implementations, the neural network 310 generates the replacement action 226 based on contextual information 362 characterizing the XR environment 108. As illustrated in FIG. 3A, in some implementations, the contextual information 362 includes instantiated equipment representations 364 and/or instantiated character representations 366. For example, the neural network 310 may generate the replacement action 226 to increase or decrease the on-screen time of a character representation. The neural network 310 may generate the replacement action 226 based on a target collective engagement level.

In some implementations, the neural network 310 generates the replacement action 226 based on the instantiated equipment representations 364, e.g., based on the capabilities of a given instantiated equipment representation 364. In some implementations, the instantiated equipment representations 364 refer to equipment representations that are located in the XR environment 108. For example, referring to FIG. 1, the instantiated equipment representations 364 include the robot representation 112 and the drone representation 114 in the XR environment 108. In some implementations, the replacement action 226 may be performed by one of the instantiated equipment representations 364. For example, referring to FIG. 1, in some implementations, the XR content item may include an action in which the robot representation 112 fires a stun ray. If the collective engagement level indicates that the audience has a low level of engagement with this action (e.g., if the collective engagement level is below a threshold engagement level), the neural network 310 may generate a replacement action 226, e.g., firing a disintegration ray, selected to increase the collective engagement level above the target collective engagement level.

In some implementations, the neural network 310 generates the replacement action 226 for a character representation based on the instantiated character representations 366, e.g., based on the capabilities of a given instantiated character representation 366. For example, referring to FIG. 1, the instantiated character representations 366 include the character representations 110a and 110b. In some implementations, the replacement action 226 may be performed by one of the instantiated character representations 366. For example, referring to FIG. 1, in some implementations, the XR content item may include an action in which an instantiated character representation 366 fires a gun. If the collective engagement level indicates that the audience has a low level of engagement with this action (e.g., if the collective engagement level is below a threshold engagement level), the neural network 310 may generate a replacement action 226 that is within the capabilities of the instantiated character representation 366 and that is selected to increase the collective engagement level above the target collective engagement level. In some implementations, different instantiated character representations 366 may have different capabilities and may result in the generation of different replacement actions 226. For example, if the character representation 110a represents and models the behavior of a normal human, the neural network 310 may generate a punch as the replacement action 226. On the other hand, if the character representation 110b represents and models the behavior of a superpowered human, the neural network 310 may instead generate a nonlethal energy attack as the replacement action 226.

In various implementations, the training module 330 trains the neural network 310. In some implementations, the training module 330 provides neural network (NN) parameters 312 to the neural network 310. In some implementations, the neural network 310 includes model(s) of neurons, and the neural network parameters 312 represent weights for the model(s). In some implementations, the training module 330 generates (e.g., initializes or initiates) the neural network parameters 312, and refines (e.g., adjusts) the neural network parameters 312 based on the replacement actions 226 generated by the neural network 310.

In some implementations, the training module 330 includes a reward function 332 that utilizes reinforcement learning to train the neural network 310. In some implementations, the reward function 332 assigns a positive reward to replacement actions 226 that are desirable and a negative reward to replacement actions 226 that are undesirable. In some implementations, during a training phase, the training module 330 compares the replacement actions 226 with verification data that includes verified actions, e.g., actions that are known to satisfy the objectives of the objective-effectuator. In such implementations, if the replacement actions 226 are within a degree of similarity to the verified actions, then the training module 330 stops training the neural network 310. However, if the replacement actions 226 are not within the degree of similarity to the verified actions, then the training module 330 continues to train the neural network 310. In various implementations, the training module 330 updates the neural network parameters 312 during/after the training.

In various implementations, the scraper 350 scrapes content 352 to identify the candidate replacement actions 360, e.g., actions that are within the capabilities of a character represented by a representation. In some implementations, the content 352 includes movies, video games, comics, novels, and fan-created content such as blogs and commentary. In some implementations, the scraper 350 utilizes various methods, systems, and/or devices associated with content scraping to scrape the content 352. For example, in some implementations, the scraper 350 utilizes one or more of text pattern matching, HTML (Hyper Text Markup Language) parsing, DOM (Document Object Model) parsing, image processing and audio analysis to scrape the content 352 and identify the candidate replacement actions 360.

In some implementations, an objective-effectuator is associated with a type of representation 354, and the neural network 310 generates the replacement actions 226 based on the type of representation 354 associated with the objective-effectuator. In some implementations, the type of representation 354 indicates physical characteristics of the objective-effectuator (e.g., color, material type, texture, etc.). In such implementations, the neural network 310 generates the replacement actions 226 based on the physical characteristics of the objective-effectuator. In some implementations, the type of representation 354 indicates behavioral characteristics of the objective-effectuator (e.g., aggressiveness, friendliness, etc.). In such implementations, the neural network 310 generates the replacement actions 226 based on the behavioral characteristics of the objective-effectuator. For example, the neural network 310 generates a replacement action 226 of throwing a punch for the character representation 110a in response to the behavioral characteristics including aggressiveness. In some implementations, the type of representation 354 indicates functional and/or performance characteristics of the objective-effectuator (e.g., strength, speed, flexibility, etc.). In such implementations, the neural network 310 generates the replacement actions 226 based on the functional characteristics of the objective-effectuator. For example, the neural network 310 generates a replacement action 226 of projecting a stun ray for the character representation 110b in response to the functional and/or performance characteristics including the ability to project a stun ray. In some implementations, the type of representation 354 is determined based on a user input. In some implementations, the type of representation 354 is determined based on a combination of rules.

In some implementations, the neural network 310 generates the replacement actions 226 based on specified actions 356. In some implementations, the specified actions 356 are provided by an entity that controls (e.g., owns or creates) the fictional material from which the character or equipment originated. For example, in some implementations, the specified actions 356 are provided by a movie producer, a video game creator, a novelist, etc. In some implementations, the candidate replacement actions 360 include the specified actions 356. As such, in some implementations, the neural network 310 generates the replacement actions 226 by selecting a portion of the specified actions 356.

In some implementations, the candidate replacement actions 360 for an objective-effectuator are limited by a limiter 370. In some implementations, the limiter 370 restricts the neural network 310 from selecting a portion of the candidate replacement actions 360. In some implementations, the limiter 370 is controlled by the entity that owns (e.g., controls) the fictional material from which the character or equipment originated. For example, in some implementations, the limiter 370 is controlled by a movie producer, a video game creator, a novelist, etc. In some implementations, the limiter 370 and the neural network 310 are controlled/operated by different entities.

In some implementations, the limiter 370 restricts the neural network 310 from generating replacement actions that breach a criterion defined by the entity that controls the fictional material. For example, the limiter 370 may restrict the neural network 310 from generating replacement actions that would be inconsistent with the character represented by a representation. In some implementations, the limiter 370 restricts the neural network 310 from generating replacement actions that change the content rating of an action by more than a threshold amount. For example, the limiter 370 may restrict the neural network 310 from generating replacement actions with content ratings that differ from the content rating of the original action by more than the threshold amount. In some implementations, the limiter 370 restricts the neural network 310 from generating replacement actions for certain actions. For example, the limiter 370 may restrict the neural network 310 from replacing certain actions designated as, e.g., essential by an entity that owns (e.g., controls) the fictional material from which the character or equipment originated.

Figure 3B:
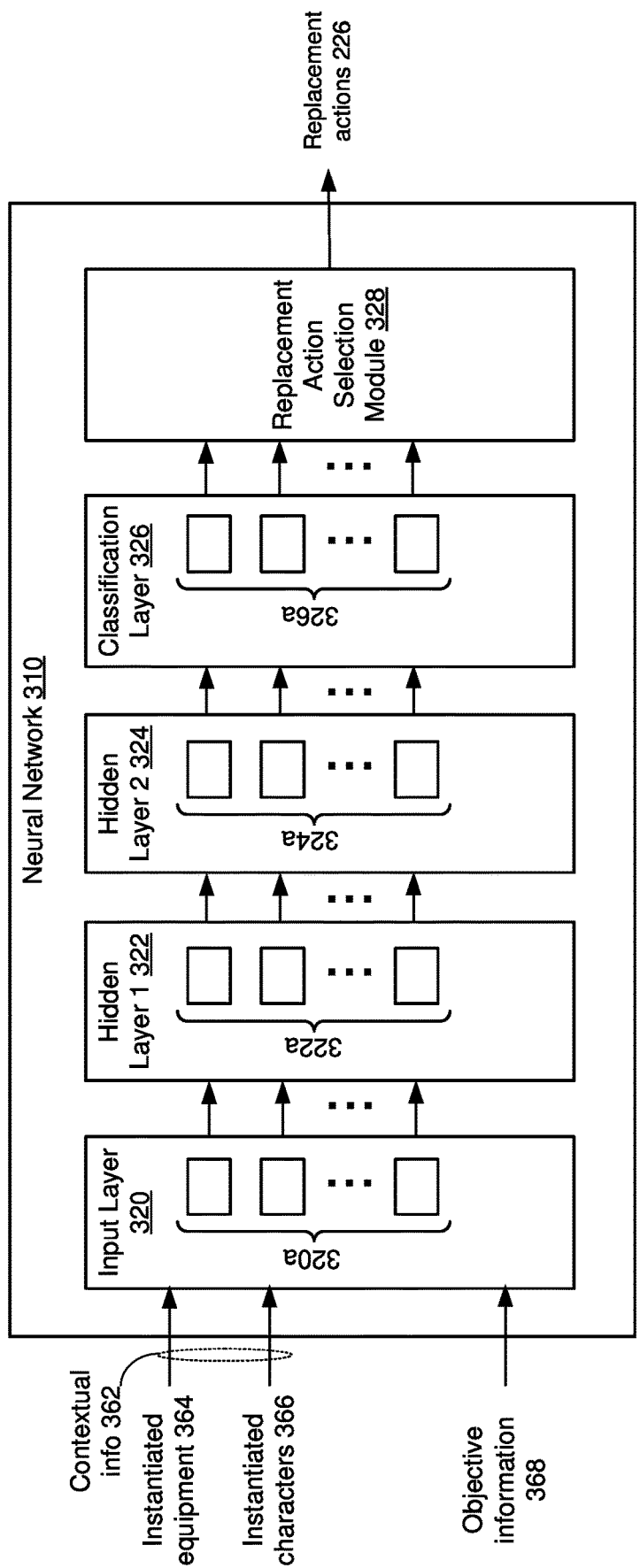
FIG. 3B is a block diagram of a neural network forming part of the content generation device of FIG. 3A, in accordance with some implementations.

FIG. 3B is a block diagram of the neural network 310 in accordance with some implementations. In the example of FIG. 3B, the neural network 310 includes an input layer 320, a first hidden layer 322, a second hidden layer 324, a classification layer 326, and a replacement action selection module 328. While the neural network 310 includes two hidden layers as an example, those of ordinary skill in the art will appreciate from the present disclosure that one or more additional hidden layers are also present in various implementations. Adding additional hidden layers adds to the computational complexity and memory demands but may improve performance for some applications.

In various implementations, the input layer 320 receives various inputs. In some implementations, the input layer 320 receives the contextual information 362 as input. In the example of FIG. 3B, the input layer 320 receives inputs indicating the instantiated equipment representations 364, the instantiated character representations 366, and/or objective information 368 from the objective-effectuator engines. In some implementations, the neural network 310 includes a feature extraction module (not shown) that generates a feature stream (e.g., a feature vector) based on the instantiated equipment representations 364, the instantiated character representations 366, and/or the objective information 368. In such implementations, the feature extraction module provides the feature stream to the input layer 320. As such, in some implementations, the input layer 320 receives a feature stream that is a function of the instantiated equipment representations 364, the instantiated character representations 366, and/or the objective information 368. In various implementations, the input layer 320 includes one or more LSTM logic units 320a, which are also referred to as neurons or models of neurons by those of ordinary skill in the art. In some such implementations, an input matrix from the features to the LSTM logic units 320a includes rectangular matrices. The size of this matrix is a function of the number of features included in the feature stream.

In some implementations, the first hidden layer 322 includes one or more LSTM logic units 322a. In some implementations, the number of LSTM logic units 322a ranges between approximately 10-500. Those of ordinary skill in the art will appreciate that, in such implementations, the number of LSTM logic units per layer is orders of magnitude smaller than previously known approaches (e.g., being of the order of $O(10^1)$-$O(10^2)$), which facilitates embedding such implementations in highly resource-constrained devices. As illustrated in the example of FIG. 3B, the first hidden layer 322 receives its inputs from the input layer 320.

In some implementations, the second hidden layer 324 includes one or more LSTM logic units 324a. In some implementations, the number of LSTM logic units 324a is the same as or similar to the number of LSTM logic units 320a in the input layer 320 or the number of LSTM logic units 322a in the first hidden layer 322. As illustrated in the example of FIG. 3B, the second hidden layer 324 receives its inputs from the first hidden layer 322. Additionally or alternatively, in some implementations, the second hidden layer 324 receives its inputs from the input layer 320.

In some implementations, the classification layer 326 includes one or more LSTM logic units 326a. In some implementations, the number of LSTM logic units 326a is the same as or similar to the number of LSTM logic units 320a in the input layer 320, the number of LSTM logic units 322a in the first hidden layer 322, or the number of LSTM logic units 324a in the second hidden layer 324. In some implementations, the classification layer 326 includes an implementation of a multinomial logistic function (e.g., a soft-max function) that produces a number of outputs that is approximately equal to the number of candidate replacement actions 360. In some implementations, each output includes a probability or a confidence measure of the corresponding objective being satisfied by the replacement action in question. In some implementations, the outputs do not include objectives that have been excluded by operation of the limiter 370.

In some implementations, the replacement action selection module 328 generates the replacement actions 226 by selecting the top N replacement action candidates provided by the classification layer 326. In some implementations, the top N replacement action candidates are likely to satisfy the objective of the objective-effectuator, satisfy the engagement threshold (e.g., the target collective engagement level), and/or are within a degree of similarity to the action that is to be replaced. In some implementations, the replacement action selection module 328 provides the replacement actions 226 to a rendering and display pipeline (e.g., the display engine 232 shown in FIG. 2). In some implementations, the replacement action selection module 328 provides the replacement actions 226 to one or more objective-effectuator engines.

Figure 4A:
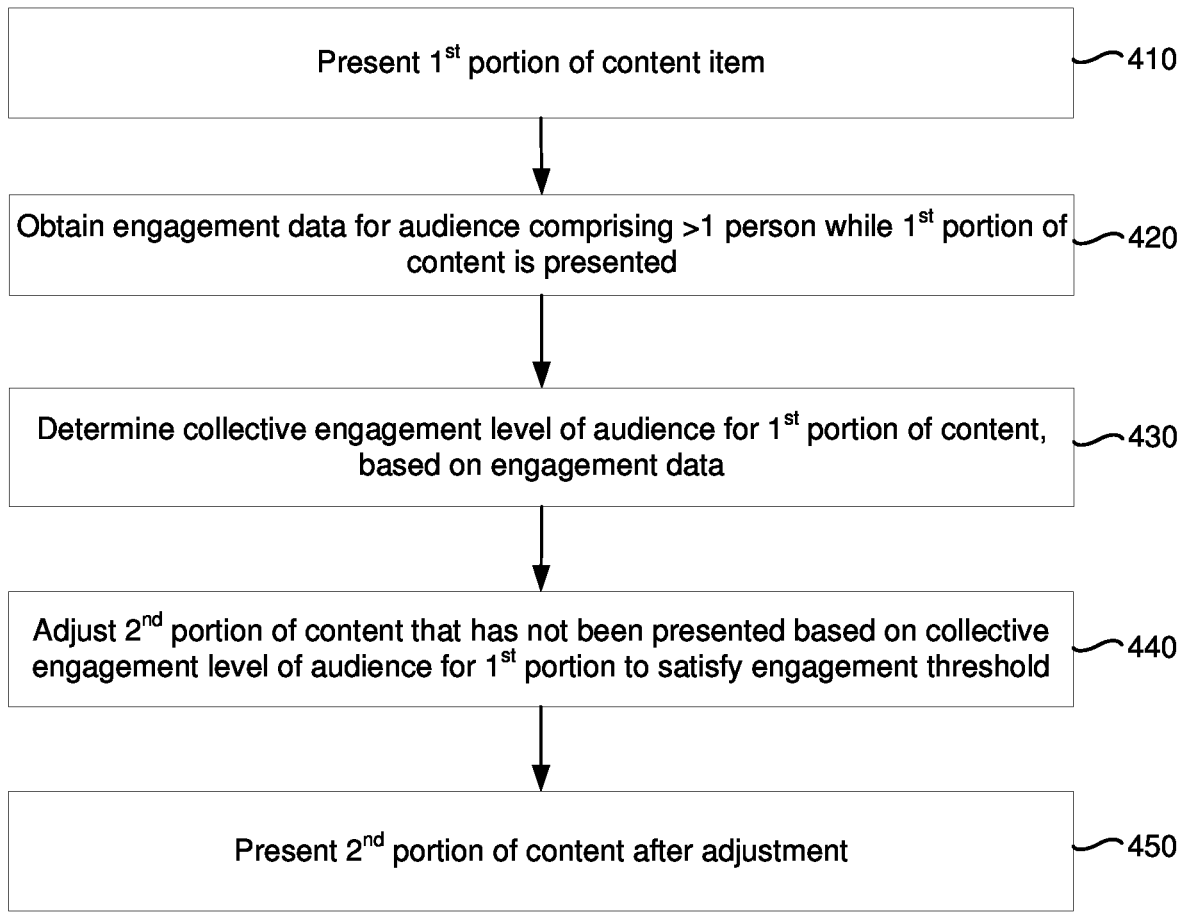
FIGS. 4A-4C are a flowchart representation of a method for performing content generation in accordance with some implementations.
Figure 4B:
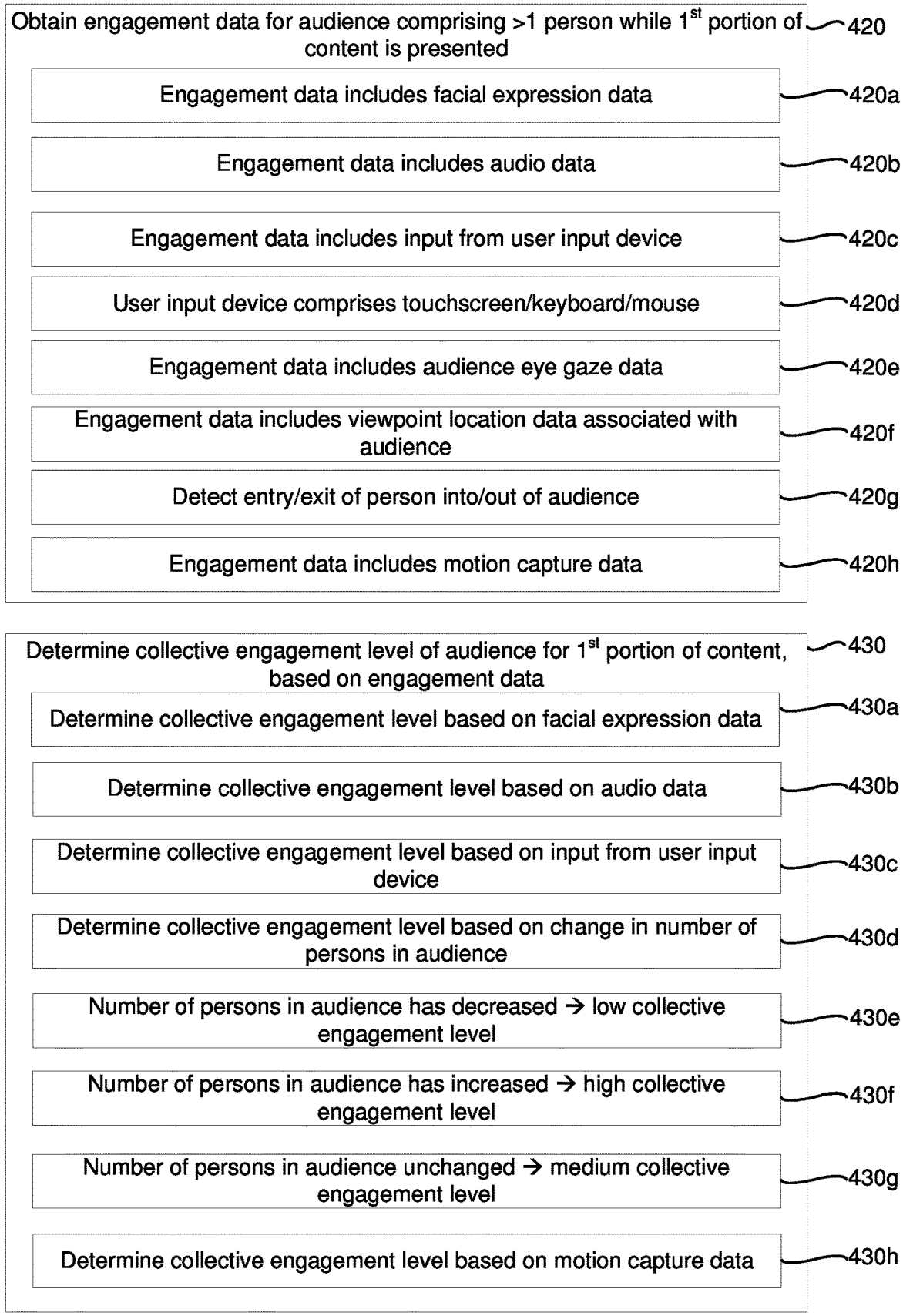
Figure 4C:
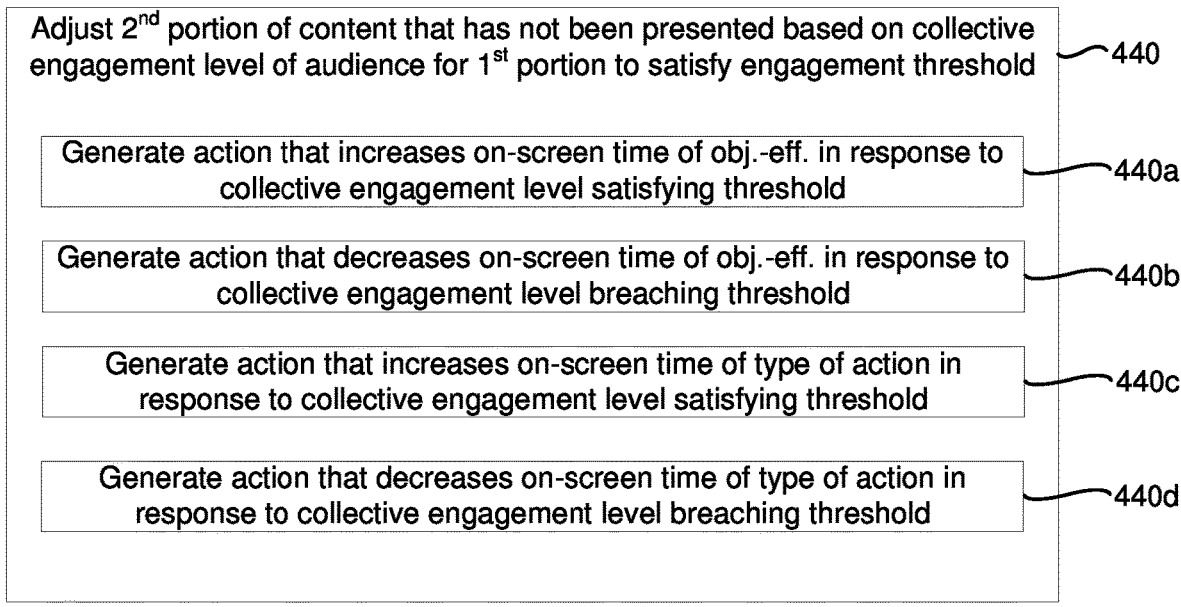

FIGS. 4A-4C are a flowchart representation of a method 400 for performing extended reality (XR) content generation based on audience engagement in accordance with some implementations. In various implementations, the method 400 is performed by a device (e.g., the system 200 shown in FIG. 2). In some implementations, the method 400 is performed by processing logic, including hardware, firmware, software, or a combination thereof. In some implementations, the method 400 is performed by a processor executing code stored in a non-transitory computer-readable medium (e.g., a memory). Briefly, in various implementations, the method 400 includes presenting a first portion of XR content, obtaining engagement data for an audience comprising a plurality of persons while the first portion of the XR content is presented, and determining a collective engagement level of the audience based on the engagement data for the first portion of the XR content. In various implementations, the method 400 includes adjusting a second portion of the XR content that has not yet been presented based on the collective engagement level of the audience for the first portion of the XR content to satisfy an engagement threshold and, after adjusting the second portion of the XR content, presenting the second portion of the XR content to the audience.

As represented by block 410, in various implementations, the method 400 includes presenting a first portion of XR content. The first portion of the XR content may be presented using one or more of a variety of devices, including, for example, one or more of a mobile device display, a tablet display, a laptop computer display, a desktop computer display, a television, a projector, and/or one or more HMDs. In some implementations, customized versions of the XR content may be presented to respective members of the audience using multiple devices, e.g., respective HMDs used by each of a plurality of persons in the audience. As an example, each device may display a customized XR environment for its respective user. For example, an HMD used by a first audience member may display the XR environment from the perspective of the first audience member, while an HMD used by a second audience member may display the XR environment from the perspective of the second audience member. As another example, in a gaming application, an in-game item possessed by one audience member may allow that audience member to view elements in the XR environment that are not visible to other audience members. In some implementations, HMDs used by different audience members show or conceal an element in the XR environment depending on whether that element is visible to a respective audience member associated with a particular HMD.

As represented by block 420, in some implementations, the method 400 includes obtaining engagement data for an audience comprising a plurality of persons while the first portion of the XR content is presented. The engagement data may include data from one or more inputs. For example, referring to FIG. 4B, as represented by block 420*a*, the engagement data may include facial expression data captured by a camera and/or a tactile input device. Smiles or other positive facial expressions may be interpreted as indicative of a high engagement level (e.g., an engagement level that is above a threshold engagement level). By contrast, frowns or other negative facial expressions may be interpreted as indicative of a low engagement level (e.g., as an engagement level that is below a threshold engagement level).

As another example, as represented by block 420*b*, the engagement data may include audio data captured by an audio sensor, such as a microphone. Audio data may include vocalizations produced by the audience. For example, laughter may be interpreted as indicative of a high engagement level (e.g., an engagement level that is above a threshold engagement level). Groans or yawns may be interpreted as indicative of a low engagement level (e.g., as an engagement level that is below a threshold engagement level).

In some implementations, as represented by block 420*c*, the engagement data may include input received by a user input device. As represented by block 420*d*, the user input device may include one or more of a mouse, a keyboard, and/or a touchscreen, for example. In some implementations, for example, one or more members of the audience provides feedback regarding the first portion of the XR content using a graphical user interface provided on a touchscreen.

In some implementations, as represented by block 420*e*, the engagement data includes audience eye gaze data. As represented by block 420*f*, the engagement data may include viewpoint location data associated with the audience. For example, an audience-facing image sensor may be used to capture images of the eyes of audience members. The images may be analyzed to determine gaze vectors associated with the audience members and/or objects or locations at which audience members are looking.

In some implementations, as represented by block 420*g*, obtaining engagement data includes detecting entry of a person into the audience and/or exit of a person from the audience. Entry and exit of persons into and out of the audience may be detected, for example, using a camera or other sensor.

In some implementations, as represented by block 420*h*, the engagement data includes motion capture data. Motion capture data may include, for example, information relating to body pose, posture, and/or motion of one or more members of the audience. For example, fidgeting exhibited by members of the audience may be indicative of a low level of engagement (e.g., as an engagement level that is below a threshold engagement level).

As represented by block 430, in some implementations, the method 400 includes determining a collective engagement level of the audience for the first portion of the XR content based on the engagement data. For example, the engagement data for the individual members of the audience may be averaged. As represented by block 430*a*, in some implementations, the collective engagement level is determined based on facial expression data. For example, respective device cameras associated with individual members of the audience may capture facial expressions produced in reaction to the first portion of the XR content. Each facial expression may be analyzed to determine an individual engagement level. The individual engagement levels may be averaged to determine a collective engagement level.

As represented by block 430*b*, in some implementations, the collective engagement level is determined based on audio data. For example, respective audio sensors (e.g., microphones) associated with individual members of the audience may capture vocalizations produced in reaction to the first portion of the XR content. The vocalizations produced by each individual audience member may be analyzed to determine an individual engagement level. The individual engagement levels may be averaged to determine a collective engagement level.

In some implementations, as represented by block 430*c*, the collective engagement level is determined based on input from one or more user input devices. For example, multiple members of the audience may use graphical user interfaces on respective devices to indicate their individual levels of engagement with the first portion of the XR content. These individual engagement levels may be averaged to determine a collective engagement level.

As represented by block 430*d*, in some implementations, the collective engagement level of the audience may be determined based on a change in a number of persons in the audience. For example, as represented by block 430*e*, if the number of persons in the audience has decreased, the collective engagement level of the audience may be determined to be low. As another example, as represented by block 430*f*, if the number of persons in the audience has increased, the collective engagement level of the audience may be determined to be high (e.g., an engagement level that is above a threshold engagement level). As another example, as represented by block 430*g*, if the number of persons in the audience has remained unchanged, the collective engagement level of the audience may be determined to be at a medium level.

In some implementations, as represented by block 430*h*, the collective engagement level of the audience may be determined based on motion capture data. For example, if the motion capture data indicates that one or more members of the audience are fidgeting, the collective engagement level of the audience may be determined to be low. As another example, if the motion capture data indicates that one or more members of the audience are sitting with attentive postures, the collective engagement level of the audience may be determined to be high (e.g., an engagement level that is above a threshold engagement level).

As represented by block 440, in some implementations, the method 400 includes adjusting a second portion of the XR content that has not been presented based on the collective engagement level of the audience that was determined for the first portion of the XR content in order to satisfy an engagement threshold (e.g., a threshold engagement level). As disclosed herein in connection with FIGS. 3A-3B, adjusting the second portion of the XR content may include replacing one or more actions in the second portion of the XR content with replacement actions selected to increase the collective engagement level of the audience. In some implementations, adjusting (e.g., automatically adjusting) the second portion of the XR content increases a likelihood of maintaining or increasing audience engagement with the second portion of the XR content there enhancing functionality of the device. In some implementations, adjusting (e.g., automatically adjusting) the second portion of the XR content increases a likelihood of stimulating the audience during the presentation of the second portion of the XR content there improving a user experience for the audience.

Referring now to FIG. 4C, as represented by block 440a, in some implementations, the method 400 includes generating an action that increases an on-screen time of an objective-effectuator in response to the collective engagement level satisfying a threshold. Conversely, in some implementations, as represented by block 440b, the method 400 includes generating an action that decreases the on-screen time of an objective-effectuator in response to the collective engagement level breaching a threshold. For example, if the collective engagement level is less than a target collective engagement level when a particular character is visible on screen, the emergent content engine may generate actions that decrease the on-screen time of that character.

In some implementations, as represented by block 440c, the method includes generating an action that increases an on-screen time of a type of action in response to the collective engagement level satisfying a threshold. For example, if the collective engagement level satisfies a target collective engagement level whenever a car chase sequence is visible, the emergent content engine may generate more car chase sequences in the second portion of the XR content. Conversely, as represented by block 440d, the method 400 may include generating an action that decreases an on-screen time of a type of action in response to the collective engagement level breaching a threshold. For example, if the collective engagement level is less than a target collective engagement level when a villainous character delivers a monologue, the emergent content engine may shorten or remove such monologues from the second portion of the XR content.

In some implementations, as represented by block 450, the method 400 includes presenting the second portion of the XR content to the audience after the second portion is adjusted. For example, in some implementations, the adjusted second portion of the XR content may be provided to a rendering and display engine. In some implementations, a display presents the adjusted second portion of the XR content item to the audience. In some implementations, the adjusted second portion of the XR content item is transmitted to another device that displays the adjusted second portion of the XR content item.

Figure 5:
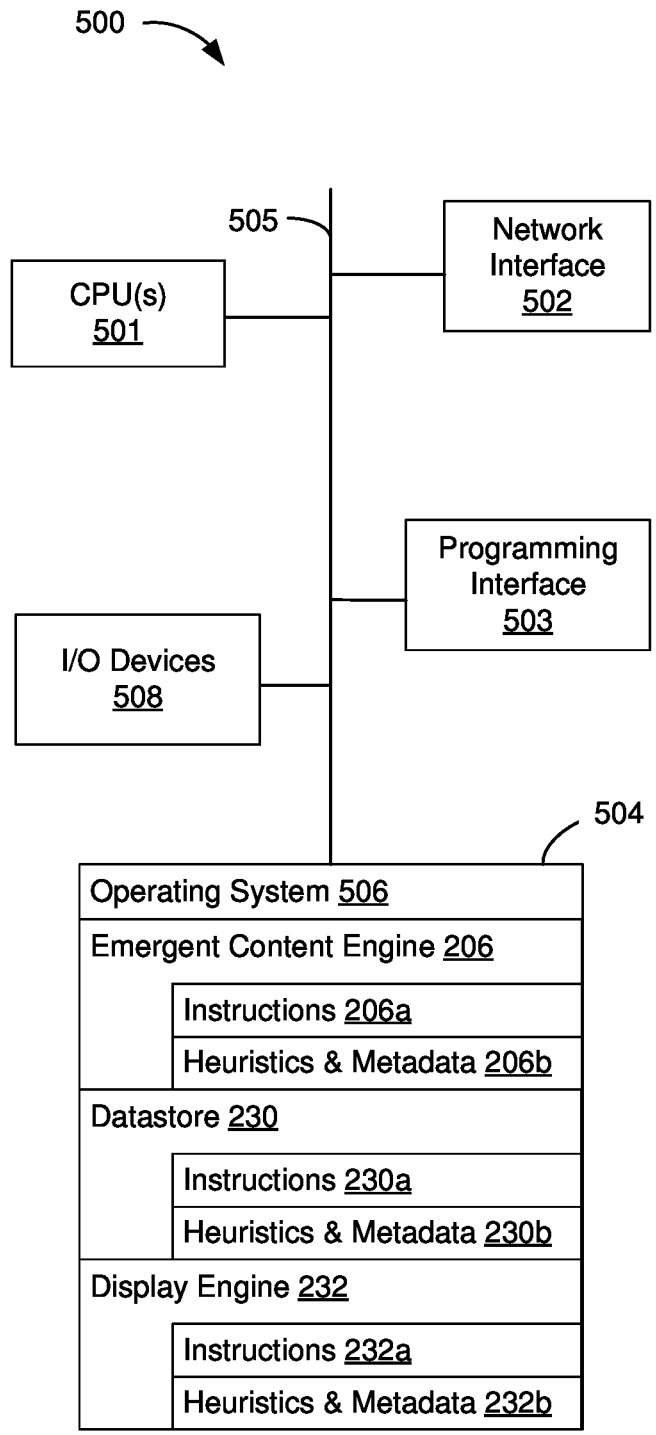
FIG. 5 is a block diagram of a server system in accordance with some implementations.

FIG. 5 is a block diagram of a server system 500 enabled with one or more components of a device (e.g., the electronic device 102 and/or the controller 104 shown in FIG. 1) in accordance with some implementations. While certain specific features are illustrated, those of ordinary skill in the art will appreciate from the present disclosure that various other features have not been illustrated for the sake of brevity, and so as not to obscure more pertinent aspects of the implementations disclosed herein. To that end, as a non-limiting example, in some implementations the server system 500 includes one or more processing units (CPUs) 501, a network interface 502, a programming interface 503, a memory 504, one or more input/output (I/O) devices 508 (e.g., the display 202, the camera 210, the audio sensor 218, and/or the user input device 222 shown in FIG. 2), and one or more communication buses 505 for interconnecting these and various other components.

In some implementations, the network interface 502 is provided to, among other uses, establish, and maintain a metadata tunnel between a cloud hosted network management system and at least one private network including one or more compliant devices. In some implementations, the one or more communication buses 505 include circuitry that interconnects and controls communications between system components. The memory 504 includes high-speed random access memory, such as DRAM, ERAM, DDR RAM or other random access solid state memory devices, and may include non-volatile memory, such as one or more magnetic disk storage devices, optical disk storage devices, flash memory devices, or other non-volatile solid state storage devices. The memory 504 optionally includes one or more storage devices remotely located from the one or more CPUs 501. The memory 504 comprises a non-transitory computer readable storage medium.

In some implementations, the memory 504 or the non-transitory computer readable storage medium of the memory 504 stores the following programs, modules and data structures, or a subset thereof including an optional operating system 506, the emergent content engine 206, the datastore 230, and/or the display engine 232. As described herein, the emergent content engine 206 may include instructions 206a and/or heuristics and metadata 206b for obtaining engagement data from an audience that indicates a degree of engagement that a person in the audience is experiencing with a content item. As described herein, the datastore 230 may include instructions 230a and/or heuristics and metadata 230b for providing one or more candidate replacement actions to the emergent content engine 206. As described herein, the display engine 232 may include instructions 232a and/or heuristics and metadata 232b for modifying a content item by replacing an original action with a replacement action to generate a modified content item.

It will be appreciated that FIG. 5 is intended as a functional description of the various features which may be present in a particular implementation as opposed to a structural schematic of the implementations described herein. As recognized by those of ordinary skill in the art, items shown separately could be combined and some items could be separated. For example, some functional blocks shown separately in FIG. 5 could be implemented as a single block, and the various functions of single functional blocks could be implemented by one or more functional blocks in various implementations. The actual number of blocks and the division of particular functions and how features are allocated among them will vary from one implementation to another and, in some implementations, depends in part on the particular combination of hardware, software, and/or firmware chosen for a particular implementation.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

What is claimed is:

1. A method comprising:
at a device including a non-transitory memory and one or more processors coupled with the non-transitory memory:
presenting a first portion of content, wherein the content includes a plurality of actions of one or more objective-effectuators and the first portion of the content includes at least a first action of the plurality of actions;
obtaining engagement data for an audience comprising a plurality of persons while the first portion of the content is presented;
determining, based on the engagement data, a collective engagement level of the audience for the first portion of the content;
in response to the collective engagement level of the audience breaching an engagement threshold, adjusting a second portion of the content that has not been presented to satisfy the engagement threshold, wherein the second portion of the content includes at least a second action of the plurality of actions and adjusting the second portion of the content includes replacing the second action with a replacement action; and
after adjusting the second portion of the content, presenting the second portion of the content.

2. The method of claim 1, wherein the engagement data comprises facial expression data and the collective engagement level of the audience is determined based on at least the facial expression data.

3. The method of claim 1, wherein the engagement data comprises audio data and the collective engagement level of the audience is determined based on at least the audio data.

4. The method of claim 1, wherein the engagement data comprises input from an input device and the collective engagement level of the audience is determined based on at least the input from the input device.

5. The method of claim 4, wherein the input device comprises at least one of a touchscreen, a keyboard, or a mouse.

6. The method of claim 1, wherein the engagement data comprises audience eye gaze data and the collective engagement level of the audience is determined based on at least the audience eye gaze data.

7. The method of claim 1, wherein the engagement data comprises viewpoint location data associated with the audience and the collective engagement level of the audience is determined based on at least the viewpoint location data associated with the audience.

8. The method of claim 1, wherein obtaining the engagement data while the first portion of the content is presented comprises detecting at least one of an entry of a person into the audience or an exit of a person from the audience.

9. The method of claim 1, further comprising determining the collective engagement level of the audience based on a change in a number of persons in the audience.

10. The method of claim 9, wherein determining the collective engagement level of the audience based on a change in a number of persons in the audience comprises determining that the collective engagement level of the audience is below a threshold engagement level on a condition that the number of persons in the audience has decreased.

11. The method of claim 9, wherein determining the collective engagement level of the audience based on a change in a number of persons in the audience comprises determining that the collective engagement level of the audience is above a threshold engagement level on a condition that the number of persons in the audience has increased.

12. The method of claim 9, wherein determining the collective engagement level of the audience based on a change in a number of persons in the audience comprises determining that the collective engagement level of the audience is medium on a condition that the number of persons in the audience has remained unchanged.

13. The method of claim 1, wherein the engagement data comprises motion capture data and the collective engagement level of the audience is based at least on the motion capture data.

14. The method of claim 1, wherein adjusting the second portion of the content includes adding an action of a particular objective-effectuator of the one or more objective-effectuators to the plurality of actions that increases an on-screen time of llanll the particular objective-effectuator.

15. The method of claim 1, wherein the one or more objective-effectuators are one or more representations of one or more fictional or physical entities in extended reality content.

16. The method of claim 1, wherein the replacement action satisfies a same objective as the second action.

17. The method of claim 1, wherein adjusting the second portion of the content includes adding an action of a particular type to the plurality of actions that increases an on-screen time of the particular type of action.

18. A device comprising:
one or more processors;
a non-transitory memory; and
one or more programs stored in the non-transitory memory, which, when executed by the one or more processors, cause the device to:
present a first portion of content, wherein the content includes a plurality of actions of one or more objective-effectuators and the first portion of the content includes at least a first action of the plurality of actions;
obtain engagement data for an audience comprising a plurality of persons while the first portion of the content is presented;
determine, based on the engagement data, a collective engagement level of the audience for the first portion of the content;
in response to the collective engagement level of the audience breaching an engagement threshold, adjust a second portion of the content that has not been presented to satisfy the engagement threshold, wherein the second portion of the content includes at least a second action of the plurality of actions and adjusting the second portion of the content includes replacing the second action with a replacement action; and
after adjusting the second portion of the content, present the second portion of the content.

19. A non-transitory memory storing one or more programs, which, when executed by one or more processors of a device, cause the device to:
present a first portion of content, wherein the content includes a plurality of actions of one or more objective-effectuators and the first portion of the content includes at least a first action of the plurality of actions;
obtain engagement data for an audience comprising a plurality of persons while the first portion of the content is presented;

determine, based on the engagement data, a collective engagement level of the audience for the first portion of the content;

in response to the collective engagement level of the audience breaching an engagement threshold, adjust a second portion of the content that has not been presented to satisfy the engagement threshold, wherein the second portion of the content includes at least a second action of the plurality of actions and adjusting the second portion of the content includes replacing the second action with a replacement action; and after adjusting the second portion of the content, present the second portion of the content.

* * * * *